Figure 1:
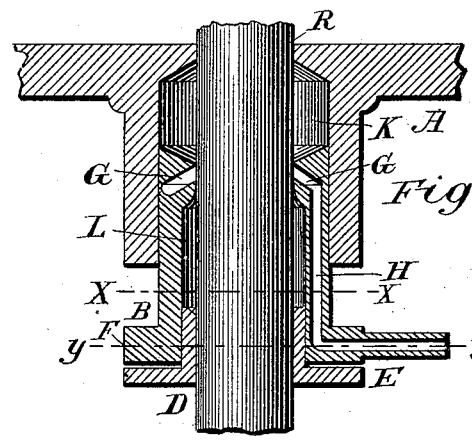

(Model.)

R. M. FRYER.
GLAND OR PACKING FOLLOWER.

No. 320,924. Patented June 30, 1885.

Witnesses:
D. W. Edelin
Chas. H. Baker

Inventor:
Robt. M. Fryer

UNITED STATES PATENT OFFICE.

ROBERT M. FRYER, OF NEW YORK, ASSIGNOR OF ONE-HALF TO TIMOTHY O'MEARA, OF BROOKLYN, N. Y.

GLAND OR PACKING-FOLLOWER.

SPECIFICATION forming part of Letters Patent No. 320,924, dated June 30, 1885.

Application filed January 20, 1885. (Model.)

*To all whom it may concern:*

Be it known that I, ROBERT M. FRYER, a citizen of the United States, residing at New York city, in the county of New York and State of New York, have invented certain new and useful Improvements in Glands or Packing-Followers; and I do hereby declare the following to be a full, clear, and exact description of the invention, such as will enable others skilled in the art to which it appertains to make and use the same.

The object of this invention is to provide against the visible leakage of stuffing-boxes of steam and other engines wherein piston-rods, valve, and other rods communicate between the pressure chamber or chambers and the external atmosphere. The higher the pressure the more difficult it becomes to keep the joint tight where packing of any sort is used in stuffing-boxes as now constructed, and as this pressure and the wear of the moving parts combine to destroy the packing in a short time the result is that leakage is manifested in disagreeable and accelerating proportions. In vertical engines, where the piston and valve rods work out of the bottom of the cylinder and steam-chest, this leakage becomes a source of great annoyance and discomfort, as the hot water which escapes will find its way to the cross-head and other moving parts, and will, besides rendering the same extremely untidy, actually rob the joints of oil or other agent used for lubricating the same.

This invention provides for an extra or secondary packing between the main packing and the outward face of the gland. This secondary packing is located in a recess in the gland proper, and is pressed and held in place by a secondary gland or screw which enters this recess, which is formed between the wall of the gland proper next to the rod which slides, oscillates, or rotates therein. The main packing in a stuffing-box is held in place by this gland the same as by the use of any other gland, and it is therefore certain that more or less leakage will occur at this point; but between this packing and the secondary packing above described I provide an annular recess connecting with a passage leading to the rim of the gland where it unites with a pipe or other passage leading to a condenser or other desired point. Now, therefore, if this gland is used in connection with a condensing-engine, a vacuum may be formed between the main and secondary packing, rendering a visible leak at the face of the gland impossible, and even where the escape-pipe leads off to a drain in the ordinary manner of arranging "pet-pipes" this gland will not admit of visible leakage, for the reason that the pressure is principally overcome by the main packing.

In order, however, that this invention will be fully understood, that its novelty and usefulness will be readily observed, I will proceed with the general description, having reference to the accompanying drawings, in which—

Figure 2:
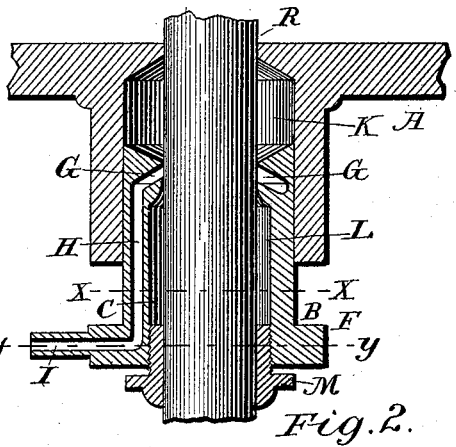
Figure 3:
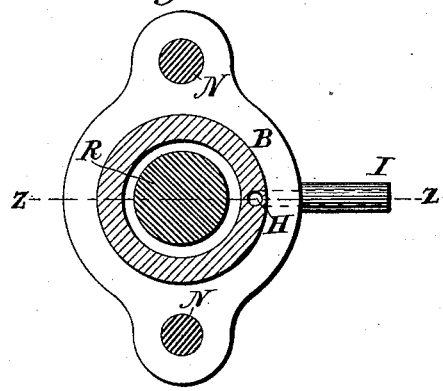
Figure 4:
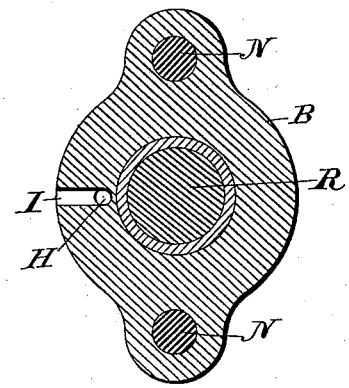
Figure 5:
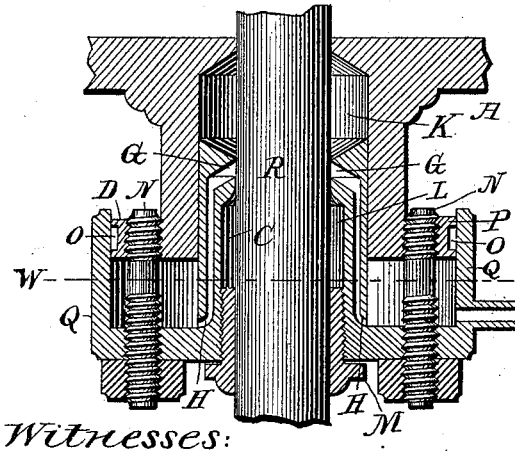
Figure 6:
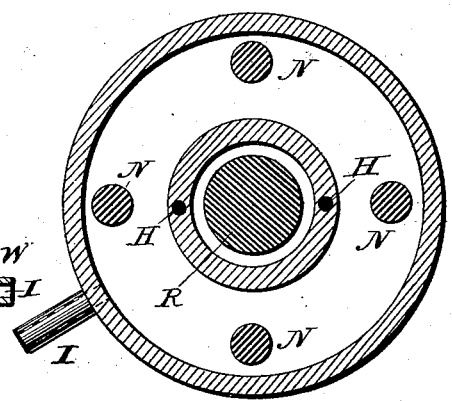

Figure 1 represents a vertical section of an ordinary stuffing-box provided with one form of my invention, wherein the secondary gland is operated by the same bolts which force the gland proper against the main packing. This view is taken on line Z Z, Fig. 3, the flanges of both glands being alike, or nearly so, in shape, as shown. Fig. 2 represents a device similar in all respects, except that the secondary packing is held in place by a screw-gland which is forced against the said packing by means of the screw-thread upon said gland, as shown, so that the main gland may be operated independently of the secondary gland. Fig. 3 represents a cross-section of Figs. 1 and 2 looking downward from line X X. Fig. 4 represents the same, looking from line Y Y, wherein the escape-pipe is shown leading to rim of the flange. Fig. 5 represents a vertical section of an ordinary stuffing-box provided with my improved gland, wherein a flange-rim is employed to extend back and cover the rim of the stuffing-box flange, forming what is known as a "fancy stuffing-box." Here, instead of conducting the escaped matter from the receptacle (between the packings) out in the manner already described, it is allowed to pass into the chamber formed between the two flanges and the rim, from whence it escapes through a pipe or other suitable passage to any desired point. Fig. 6 represents a cross-section of Fig. 5 through the line W W, where it will be seen that a pipe is provided to carry off the water and other matter which collects in the above-described chamber, which chamber is kept tight by an expedient hereinafter referred to.

In Fig. 1 of my drawings, A represents the stuffing-box, which may be the same as any ordinary stuffing-box. B is the gland, provided with a recess, C, into which a secondary gland, D, having flange E, which corresponds with the stuffing-box flange F. (Shown from the face in Fig. 3.) G is an annular recess formed in the main gland B, as shown, and connects with passage H, which leads down to the flange E, taking a right-angular course at this point leads off through a passage or pipe, I, to any desired point. At the top of gland B there is a space, K, left for packing; and L, in and at the other end of said B, represents the space for the secondary packing, which is, as above described, pressed and held in place by gland D, which is operated by bolts N, together with gland B. (Shown in Fig. 3.) R represents the piston or valve rod working in the same.

In Fig. 2 the device only differs from the above in the manner of holding the secondary packing in place. Here the same is accomplished by the screw-gland M, which is threaded to fit a similar thread in the recess of gland B, dispensing with gland D, which is operated in the above case with the main gland.

In Fig. 5 the conditions are the same as in Fig. 2, except that a chamber is formed between the flanges and the rim Q of the gland-flange, while the rim P of the stuffing-box flange is provided with a gasket, O, which forms a tight joint at the point of contact between O and Q, as shown. All other letters of reference in Figs. 1, 2, and 3 as regards to packing-chambers and recesses as well as passages being identically the same. Where the rim of the gland is screwed on the flange, gasket O is dispensed with.

I wish here to state that I am aware that packing may be adjusted in a recess of a gland without a secondary gland, and that various forms of packing may be used.

Having thus described my invention, what I claim, and desire to secure by Letters Patent of the United States, is—

1. In a stuffing-box for holding packing, a gland provided inside of the barrel which enters the stuffing-box with a packing-chamber and at the end between this and the packing of the main stuffing-box an annular recess or chamber provided with a passage leading to a condenser or to the open air, as and for the purposes described.

2. In a stuffing-box for holding packing, a gland provided between the piston-rod and the walls of said stuffing-box with an annular chamber provided with a passage in said gland between the packing-chamber in the same and the walls of the main stuffing-box, the said passage connecting at the flange of gland with an angular passage leading to a condenser or to the open air, for the purpose above set forth.

3. In a stuffing-box for steam-engines, a gland provided inside next to the piston-rod with a packing-chamber adapted to receive a gland within the radius of main gland and also a passage to the flange of said main gland, as shown, all being combined with an annular recess within the said main gland between its face and the main packing of the stuffing-box, substantially as and for the purpose set forth.

In testimony whereof I affix my signature in presence of two witnesses.

ROBERT M. FRYER.

Witnesses:
WILLIAM H. CLARKSON,
M. J. McGUIRE.